United States Patent [19]
Donnelly et al.

[11] Patent Number: 5,339,636
[45] Date of Patent: Aug. 23, 1994

[54] FUEL SPLITTER VALVE ASSEMBLY FOR GAS TURBINE

[75] Inventors: Brian G. Donnelly, Suffield; Gerald P. Dyer, Enfield; Charles E. Wiesner, Glastonbury, all of Conn.

[73] Assignee: United Technologies Corporation, Windsor Locks, Conn.

[21] Appl. No.: 985,769

[22] Filed: Dec. 4, 1992

[51] Int. Cl.⁵ .............................. F02C 1/00; F02G 3/00
[52] U.S. Cl. .................................... 60/734; 60/739; 60/741; 60/39.281; 137/100
[58] Field of Search .................. 60/734, 739, 740, 741, 60/39.281; 137/100, 101, 565, 883

[56] References Cited

U.S. PATENT DOCUMENTS

| | | | |
|---|---|---|---|
| 2,951,341 | 9/1960 | Henning, Jr. et al. | 60/739 |
| 3,493,005 | 2/1970 | Kakegawa | 137/100 |
| 3,770,198 | 11/1973 | Mihara | 137/100 |
| 3,995,660 | 12/1976 | Kast | 60/739 |
| 4,551,972 | 11/1985 | Lewis | 60/39.281 |
| 4,876,857 | 10/1989 | Feltz et al. | 60/734 |
| 4,920,740 | 5/1990 | Shekleton | 60/739 |
| 4,949,538 | 8/1990 | Iasillo et al. | 60/39.465 |
| 5,020,315 | 6/1991 | Leachman, Jr. et al. | 60/734 |
| 5,036,657 | 8/1991 | Seto et al. | 60/39.281 |
| 5,148,671 | 9/1992 | Kast et al. | 60/39.281 |

*Primary Examiner*—Richard A. Bertsch
*Assistant Examiner*—Howard R. Richman

[57] ABSTRACT

A fuel delivery system (10) incorporates a fuel splitter valve assembly (30) including a first valve (40) having a selectively positionable spool (42) disposed therein for controllably metering fuel flow therethrough for delivery to a first combustion chamber (22) and a second valve (50) operative to pass a second portion of the fuel flow to a second combustion chamber (24) while maintaining at least a desired minimum pressure upstream of the first valve (40) whenever the second combustion chamber is in operation, and to shut-off fuel flow to the second combustion chamber whenever the second combustion chamber is not in operation.

2 Claims, 3 Drawing Sheets

FUEL SPLITTER VALVE ASSEMBLY FOR GAS TURBINE

TECHNICAL FIELD

The present invention relates generally to the supply of fluid fuel to a combustor, and more particularly a fuel splitter valve for use on a turbine engine for proportioning fuel being supplied to the combustor of the turbine engine into a first portion for delivery to a first set of nozzles and at least a second portion for delivery to a second set of nozzles.

BACKGROUND ART

Gas turbine engines, whether ground based power generation turbines or aircraft engines, produce undesirable nitrogen oxides as a result of the high temperatures associated with combustion of fuel in the burner section thereof, commonly referred to as the combustor. Naturally, it is desirable to reduce the emission of nitrogen oxides. Although it is possible to catalytically reduce nitrogen oxides back to nitrogen and oxygen, it is more effective to reduce nitrogen oxide emissions by reducing the formation of nitrogen oxides during combustion.

It is well known that the formation of nitrogen oxides during combustion of fuel in the combustor of a gas turbine engine at high power may be reduced by sectioning the combustor into two or more combustion chambers disposed in series such that the products of combustion formed in the upstream chamber pass through the downstream chamber. For example, U.S. Pat. No. 4,045,956 discloses a two zone combustor wherein a first portion of the fuel is burned in a pilot zone to provide a flow of hot gases into which additional fuel is injected before additional combustion air is added to complete combustion in a second zone of the combustor.

While effective in stretching out the combustion process so as to reduce peak temperatures and consequently nitrogen oxide formation, the use of multiple combustion chambers complicates operation, particularly if fuel is to be supplied independently to each of the combustion chambers. In order to do so, it is known to provide a fuel splitter valve in the fuel supply system of the gas turbine engine, the fuel splitter valve being positioned downstream of a fuel metering unit (FMU) which meters total fuel flow to the turbine engine in response to various operating parameters, for example power level and engine speed. The fuel splitter valve receives the total metered fuel flow from the FMU and functions to split the received fuel flow into a plurality of output flows, one per each combustion chamber. Each output flow is directed to a fuel supply manifold associated with a particular combustion chamber for distribution to the individual fuel nozzles associated with that combustion chamber and fuel supply manifold.

U.S. Pat. No. 4,949,538 discloses a system for supplying gaseous fuel to a combustor of a power generation type gas turbine wherein the gaseous fuel is supplied to two distinct zones of the combustor. The system includes a fuel flow splitter assembly which receives a metered gas flow from a main flow control and splits the received gas flow into two streams, one for delivery to a primary zone of the combustor and the other to a secondary zone of the combustor of the turbine engine. The fuel flow splitter comprises a coordinated valve splitter assembly having a linear trim valve controlling the primary gas flow in parallel with an equal-percentage trim valve controlling the secondary gas flow. The proportion of the fuel flow output to the primary and secondary zones is dependent upon the relative flow area through the primary and secondary valves, respectively. In one embodiment, coordination of the primary and secondary valves is accomplished through rigid mechanical connection of the valve shafts. Coordination may also be accomplished through shaped cams actuating the primary and secondary valves or through individual hydraulic actuators associated with each of the primary and secondary valves and an electronic control effective for appropriately shaping the control characteristics of each of the hydraulic actuators. With the primary and secondary valves being coordinated, the change in fuel flow to the primary and secondary zones may be undesirably slow during a rapid transition such as may be necessary in an aircraft turbine engine.

DISCLOSURE OF INVENTION

It is an object of the present invention to provide a fuel flow splitter valve assembly for metering fuel to each combustion chamber of a multiple chamber combustor on a gas turbine engine, particularly an aircraft gas turbine engine.

It is a further object of the present invention to provide a fuel flow splitter valve assembly adapted to receive a total fuel flow to be delivered to the combustor and to accurately proportion the received fuel flow between a first combustion chamber and at least one additional combustion chamber.

The fuel splitter valve assembly of the present invention is adapted to receive a flow of fuel, for example a metered fuel flow from a fuel metering unit responsive to operating conditions of a gas turbine engine, and is operative to split the received fuel flow into a first portion for delivery to a first combustion chamber of the gas turbine and at least a second portion for delivery to a second combustion chamber. The fuel splitter valve assembly includes first valve means for controlling fuel flow to the first combustion chamber and a second valve means for controlling fuel flow to the second combustion chamber. The first valve means has a selectively positionable spool disposed therein for controllably metering fuel flow through the first valve means for delivery to the first combustion chamber and a self-positioning pressure regulating spool disposed therein for adjusting the magnitude of the pressure drop across the first valve means. The second valve means is operative to pass a second portion of the fuel flow to the second combustion chamber while maintaining the pressure drop across the first valve means relatively constant at a desired pressure drop and to shut-off fuel flow to the second combustion chamber whenever the pressure drop across the first valve means drops below the desired pressure drop.

In a particular embodiment, the fuel splitter valve assembly includes a first fuel passage for receiving a metered flow of fuel, a second fuel passage opening to the first fuel passage for delivering fuel flow therefrom to a first combustion chamber, and a third fuel flow passage opening to the first fuel passage for delivery fuel flow therefrom to a second combustion chamber. The first valve means is operatively disposed in the second fuel flow passage for controllably metering a first portion of the metered fuel flow through the second fuel passage for delivery to the first combustion chamber, while regulating the pressure drop through the first valve means, and the second valve means is operatively disposed in the third fuel passage for selectively opening to pass a second portion of the metered fuel flow through the third fuel passage for delivery to the second combustion chamber whenever the pressure drop across the first valve means reaches the desired pressure drop so as to maintain the desired pressure drop across the first valve means and to shut-off fuel flow to the second combustion chamber whenever the pressure drop across the first valve means drops below the desired pressure drop. In this embodiment, the first valve means comprises a flow metering and pressure regulating valve, while the second valve means comprises a pressure control and flow shut-off valve.

In a further embodiment of the invention, a third valve means may be disposed in a fourth fuel passage which opens to the third fuel passage at a location upstream of the second valve means for delivering a third portion of the metered fuel flow to a third combustion chamber. The third valve means is operative to controllably meter and regulate the pressure of the third portion of the metered fuel flow through the fourth fuel passage to the third combustion chamber. Thus, in this embodiment the first and third valve means are both flow metering and pressure regulating valves, while the second valve means comprises a fuel pressure control and flow shut-off valve.

BRIEF DESCRIPTION OF THE DRAWINGS

The aforementioned and other objects, features and advantages of the present invention will become more apparent in light of the following detailed description of the invention and the embodiments thereof illustrated in the accompanying drawing, wherein.

BEST MODE FOR CARRYING OUT THE INVENTION

Figure 1:
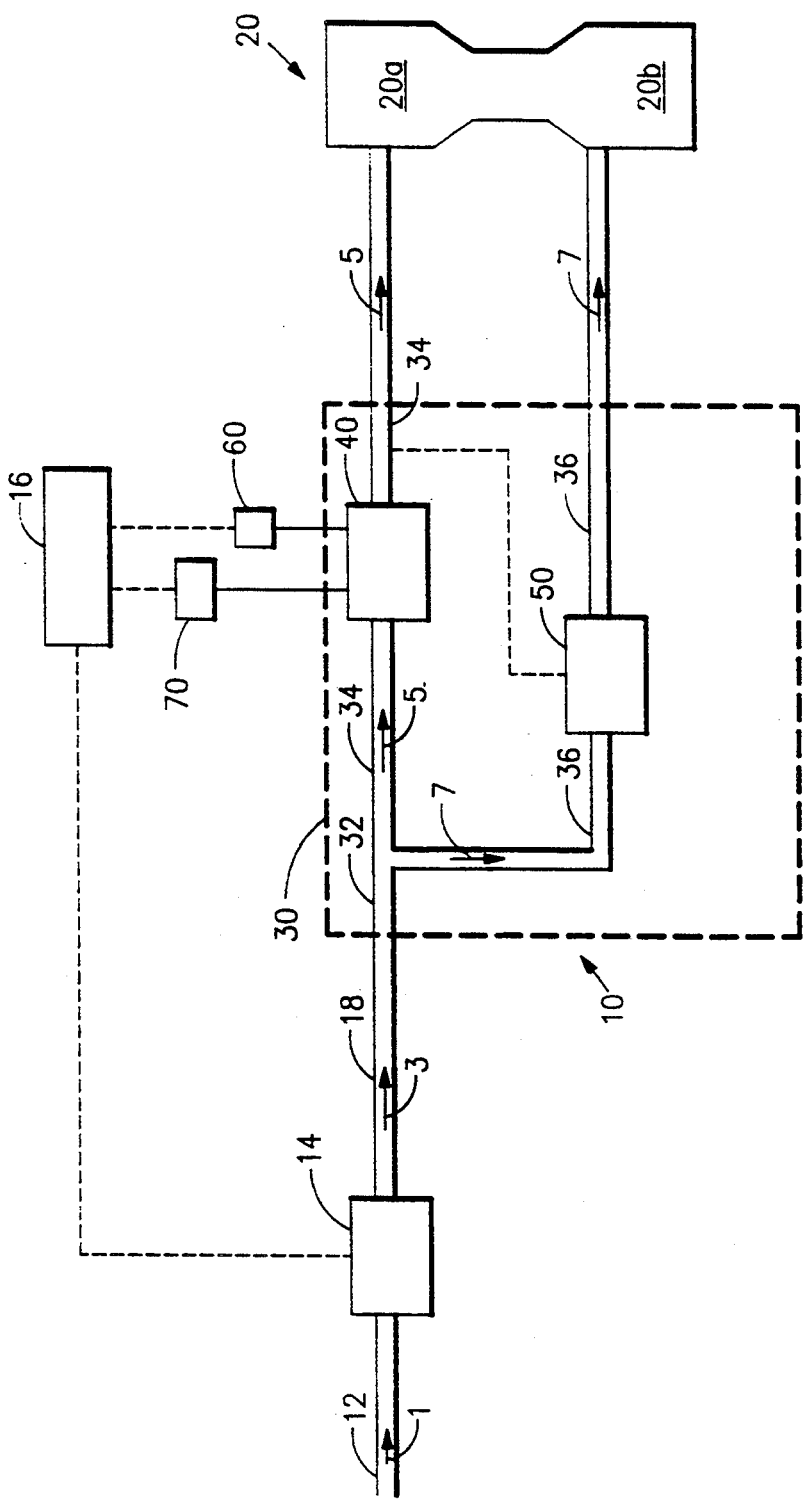
FIG. 1 is a schematic diagram of a fuel delivery system including an embodiment of the fuel splitter valve assembly of the present invention for delivering fuel to each chamber of a multi-chamber turbine engine combustor.

Referring now to FIG. 1, there is depicted therein a fuel delivery system 10 for supplying a metered amount of fluid fuel to a multi-chamber combustor of a gas turbine engine, such as for example an aircraft gas turbine engine (not shown). Multi-chamber combustors may be operated so as to produce lower oxides of nitrogen at high power and lower hydrocarbons and carbon monoxide at lower power than achievable with single chamber combustors. The combustor depicted in FIG. 1 has two combustion chambers 20a and 20b, each of which is supplied with fuel by the fuel delivery system 10. However, it is to be understood that the fuel splitter valve assembly of the present invention is not limited in application to any particular embodiment of a multi-chamber combustor, but may be utilized in fuel delivery systems feeding multi-chamber combustors of any configuration, whether axially or circumferentially or radially disposed relative to each other, and having any number of chambers.

In the fuel delivery system 10, a fuel supply conduit 12 feeds fuel flow 1 from a fuel source (not shown) to a fuel metering unit 14, which may comprise a conventional fuel metering unit of the well-known type having a flow control valve capable of controlling the amount of fuel flow 3 passing therethrough in response to engine operating conditions into a metered fuel flow conduit 18 for supply to a fuel splitter valve assembly 30 for distribution to the chambers 20a and 20b of the multi-chamber combustor 20. The operation of the fuel metering unit (FMU) 14 may be controlled as in conventional practice by an electronic engine controller (EEC) 16. The particular type of EEC utilized is not germane to this invention as any EEC commonly installed on modern aircraft turbine engines may be readily adapted by those skilled in the art to control the operation of the FMU 14 in a conventional manner to meter the amount of fuel flowing through the fuel supply conduit 12 in response to engine operating conditions to satisfy engine power demand.

The particular embodiment of the fuel splitter valve assembly 30 incorporated into the fuel delivery system 10 of FIG. 1 includes a first fuel passage 32 for receiving a metered flow 3 of fuel from the FMU 14 through the metered fuel supply conduit 18, a second fuel passage 34 opening to the first fuel passage 32 for directing fuel flow therefrom to the first combustion chamber 20a, and a third fuel flow passage 36 opening to the first fuel passage 32 for directing fuel flow therefrom to the second combustion chamber 20b. A first valve means 40 is operatively disposed in the second fuel passage 34, and a second valve means 50 is operatively disposed in the third fuel passage 36.

The first valve means 40 comprises flow metering means and pressure regulating means for controllably metering and regulating the pressure of a first fuel flow 5 of the metered fuel flow 3 through the second fuel passage 34 to the first combustion chamber 20a. The second valve means 50, however, comprises pressure control means and flow shut-off means for selectively opening to pass a second fuel flow 7 of the metered fuel flow 3 through the third fuel passage 36 to the second combustion chamber 20b whenever the second combustion chamber 20b is operating so as to maintain the fuel pressure drop across the first valve means 40 relatively constant at a desired set point pressure drop. The second valve means 50 closes to selectively shut-off the flow of fuel to the second combustion chamber whenever the pressure drop across the first valve means 40 is less than the set point pressure drop.

Operation of the first valve means 40 is controlled by the EEC 16. When it is desired to operate the first combustion chamber, the EEC 16 initially fully opens the associated valve means 40 to permit fuel flow through the conduit 34. The metering of fuel flow through the first valve means 40 is controlled by the EEC 16, acting through the valve positioning means operatively associated with the flow metering means thereof, to selectively position the flow metering means of the valve 40 to pass a desired metered flow of fuel through conduit 34. The EEC 16 also continuously monitors the position of the flow metering means of the valve means 40, using the sensed position of the flow metering means as a feedback control.

The flow of fuel to the second combustion chamber 20b is controlled by the self-positioning of the second valve means 50 in response to the pressure differential between the pressure of the fuel flow in the third fuel passage 36 which opens to the first fuel conduit upstream of the first valve means 40 and the pressure of the fuel flow in the second fuel passage 34 downstream of the first valve means 40, which pressure differential is therefore indicative of the pressure drop across the first valve means 40. Whenever the pressure drop across the first valve means 40 is below a preselected desired set point pressure drop, the second valve means 50 will automatically shut, thereby closing off flow through the third fuel passage 36 to the second combustion chamber 20b, whereby the second combustion chamber goes out of operation. When the pressure drop across the first valve means 40 approaches the preselected desired set point pressure drop across the first valve means 40 with the second valve means 50 closed, the second valve means 50 will automatically begin to selectively open to allow fuel flow through the third fuel passage 36 to second combustion chamber 20b. The degree of openness of the second valve means 50 will continuously self adjust to maintain the pressure drop across the first valve means 40 remains at the desired set point pressure drop.

Figure 2:
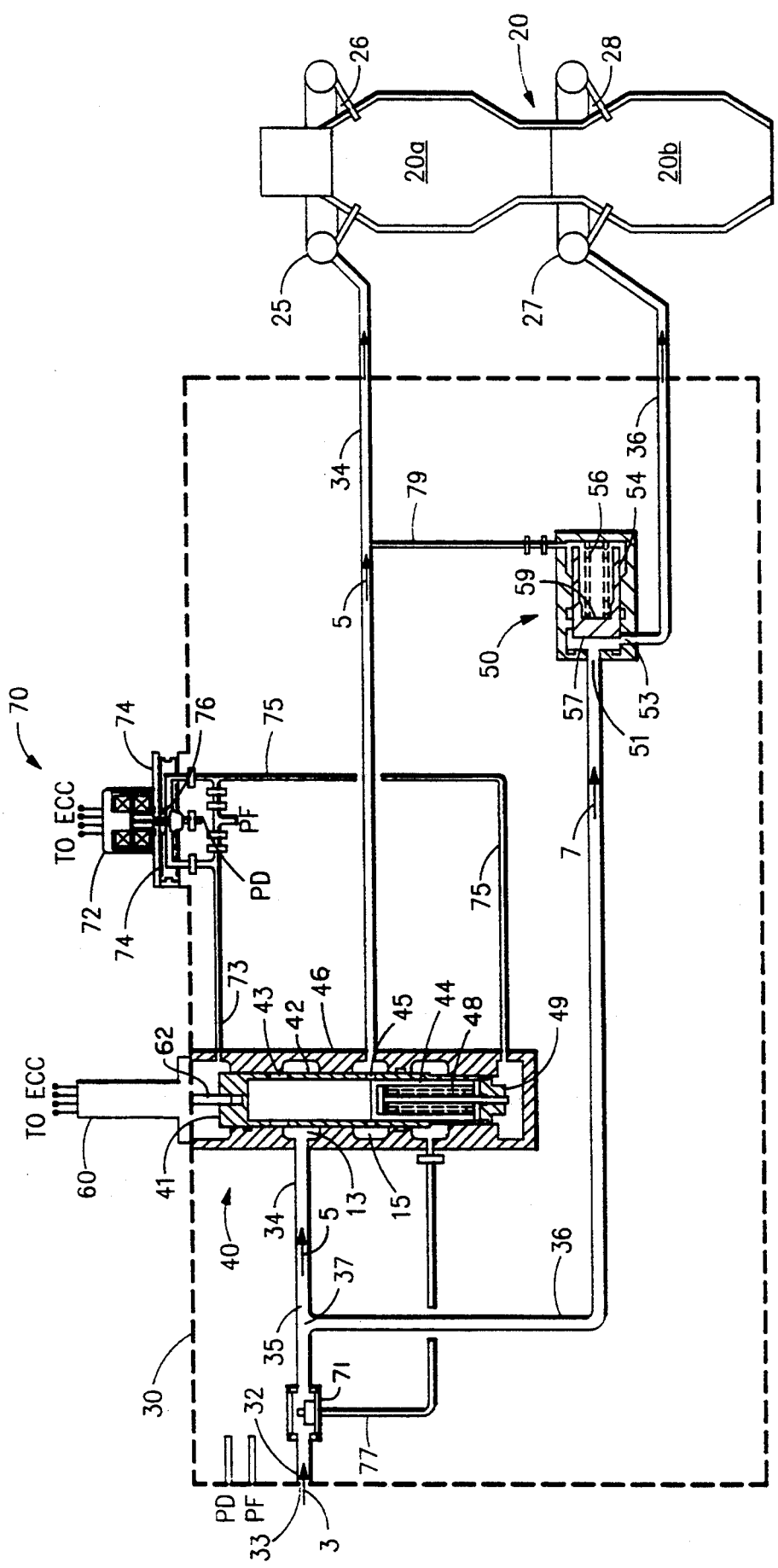
FIG. 2 is a schematic diagram of the embodiment of the fuel splitter valve of the present invention adapted for delivering fuel to each chamber of a two chamber combustor.

Referring now to FIG. 2, the output fuel flow 5 metered through the first valve means 40 passes through the second fuel passage 34 to a fuel distribution means 25 feeding a plurality of circumferentially spaced fuel nozzles 26 for injecting the fuel flow 5 into the first combustion chamber 20a, termed a pilot chamber, of the combustor 20. The output fuel flow 7 passed by the second valve means 50 passes through the third fuel passage 36 to a fuel distribution means 27 feeding a plurality of circumferentially spaced fuel nozzles 28 for injecting the fuel flow 7 into the second chamber 20b, termed a main chamber, of the combustor 20. The second combustion chamber 20b is illustrated as being serially disposed axially downstream of the pilot chamber 20a so as to receive the hot products of combustion produced in the pilot chamber, although if desired, the second combustion chamber may be disposed circumferentially or radially with respect to the pilot chamber. Reference may be made to commonly assigned, copending application Ser. No. 07/898,053, filed Jun. 12, 1992, for further details on a particularly advantageous embodiment of a two-chamber, gas turbine engine combustor.

The first fuel passage 32 of the valve assembly 30 has an inlet 33 for receiving the metered fuel flow 3 from the upstream fuel metering unit, a first outlet 35 opening to the second fuel passage 34 and a second outlet 37 opening to the third fuel passage 36. The second fuel passage has an inlet opening to the first outlet 35 of the first fuel passage 32 for receiving a first portion of the metered fuel flow 3 and an outlet connected in fluid flow communication with fuel distribution means 25. The third fuel passage has an inlet opening to the second outlet 37 of the first fuel passage 32 for receiving a second portion of the metered fuel flow 3 and an outlet connected in fluid flow communication with fuel distribution means 27. The fuel distribution means 25 and 27 may comprise, for example, a system of associated flow divider valves and fuel manifolds feeding their respective nozzles.

The first valve means 40 includes a housing 46 defining a flow chamber housing a flow metering means 42 and a pressure regulating means 44, and having an inlet lands 13 opening in fluid communication to the upstream portion of the second fuel passage 34 and an outlet lands 15 opening in fluid communication to the downstream portion of the second fuel passage 34. The flow metering means may advantageously comprise an axially displaceable spool 42 having inlet ports 43 and outlet ports 45 disposed. In operation, the flow metering spool 42 is selectively positioned axially under the command of the EEC 16 through action of the valve positioning means 70, which may comprise a torque motor and flapper damper nozzle system of the conventional type wherein a torque motor 72 acts in conjunction with a pair of opposed nozzles 74 disposed on opposite sides of a central damper 76 controlled by the torque motor. In response to control signals from the EEC 16, the torque motor differentially positions the damper between the opposed nozzles so as to vary the relative magnitudes of the pressure signals ported from the nozzles through conduits 73 and 75, respectively, to the opposite end faces 41 and 49 of the metering spool 42. By varying the relative magnitudes of the pressure signals ported to the opposite end faces 41 and 49, the axial position of the metering spool 42 may be adjusted so as to selectively increase or decrease the effective flow area of the inlet ports 43 in registration with lands 13 in the housing 46 and thus open to the upstream portion of the second fuel passage 34, thereby controlling the amount of flow through the first valve means 40 to the downstream portion of the second fuel passage 34.

The pressure regulating means of the first valve means 40 may advantageously comprise a regulating spool 44 which is axially displaceable within the first valve means 40 so as to selectively increase or decrease the effective flow area of the outlet ports 45 of the first valve means 40 in registration with outlet lands 15, whereby by the pressure drop across the effective flow area of the inlet ports 43 in registration with lands 13 in the housing 46 is regulated to a desired pressure drop. One end of the regulating spool 44 is exposed to the pressure of the fuel flow passing through the chamber of the first valve means 40, while the other end of the regulating spool 44 is exposed to the pressure of the fuel flow in the first passage 32 upstream of the outlet 35 to the second passage 34 and the outlet 37 to the third passage 36, which upstream pressure is ported to the regulating spool through conduit 77. A wash filter 71 may be disposed in the first fuel passage 32 to filter foreign matter from the fuel being ported to the regulating spool 44. As the pressure differential across the regulating spool 44 varies, the regulating spool 44, which is also biased by spring means 48 against the upstream pressure, displaces axially in response thereto, thereby adjusting the flow area of the outlet ports 45 so as to maintain the pressure drop across the inlet ports 43 relatively constant at the desired pressure drop. With the pressure drop across the inlet ports 43 being held relatively constant at the set point pressure drop by the self-positioning regulating spool 44, the amount of weight flow of fuel through the first valve means 40 will simply be a function of the effective flow area of the inlet ports 43, and the axial position of the metering spool 42 and will be representative of the amount of fuel flow passing through the first valve means 40 into the downstream passage of the second conduit 34 for delivery to the pilot chamber 20a of the combustor 20.

The axial position of the metering spool 42 is accordingly monitored through positioning sensing means 60, such as for example a linear variable differential transducer, LVDT, which senses in a conventional manner the position of an axially translate core member 62 which extends axially from the metering spool 42 into the LVDT, which generates a signal indicative of the axial position of the metering spool 42 and transmits the signal to the EEC 16. This position signal is used by the EEC 16 as a feedback control in controlling the valve positioning means 70 for positioning the metering spool 42.

The second valve 50 comprises a pressure control and flow shut-off valve operative, when the second combustor chamber is in operation, to selectively open to pass fuel flow through the downstream portion of the third fuel passage 36 while maintaining the pressure drop across the first valve means 40 at the desired set point pressure drop and to close so as to shut-off fuel flow through the third fuel passage whenever the pressure drop across the first valve means 40 is less than the set point pressure drop. It is desired to maintain the pressure drop across the first valve means 40 relatively constant at the set point pressure drop whenever a portion of the metered fuel flow 3 is being directed to the second combustor chamber so as to ensure that the pressure drop of the fuel flow passing through the first valve means 40 is high enough for proper functioning of the flow metering and pressure regulating means thereof, thereby ensuring that the fuel flow 5 being directed to the first combustion chamber may be accurately controlled by the EEC simply by positioning the metering valve means 42.

The second valve means 50 may advantageously comprise a spring bias piston valve having a housing defining a flow chamber having an inlet 51 opening to the upstream portion of the third fuel passage 36 and an outlet 53 opening to the downstream portion of the third fuel passage 36. The piston 54 is disposed within the flow chamber and is displaceable in an axial direction away from a first position, at which it closes off the inlet 51, against spring means 56 to open to allow fuel flow to pass therethrough into the downstream portion of the third fuel passage 36 for delivery to the fuel distribution system and the fuel nozzles associated therewith for injection into the second combustion chamber of the turbine engine. The upstream face 57 of the piston 54 is exposed to the fuel pressure in the upstream portion of the third passage 36, which pressure is indicative of the pressure of the fuel flow entering the first valve means 40, while the downstream face 59 of the piston 54 is exposed not only to the fuel pressure in the downstream portion of the second fuel passage 34, i.e. the pressure of the fuel flow 5 discharging from the first valve means 40 and being delivered to the first combustion chamber, but also the bias force of the spring 56. The pressure of the fuel flow 5 is ported to the downstream face 59 of the piston 54 through conduit 79. Therefore, the pressure differential between the fuel pressure acting on the upstream face 57 of the piston 54 and that acting on the downstream face 59 of the piston 54 is indicative of the actual pressure drop experienced in fuel flow 5 flowing through the first valve means 40.

In operation, whenever the fuel pressure in the third fuel passage 36 upstream of the second valve means 50 is high enough to exert a force on the upstream face 57 of the piston 54 sufficient to overcome the summation of the bias spring force and the force of the fuel pressure in the downstream portion of the second fuel passage 34 exerted upon the downstream face 59 of the piston 54, the piston 54 translates away from the inlet 51 to admit fuel flow into the flow chamber and to selectively increase the flow area of the outlet 53 thereby permitting a limited amount of fuel flow through the downstream portion of the third fuel passage 36 to the second combustion chamber. The spring means 56 is selected to provide that bias force necessary upon the downstream face 59 to ensure that the piston 54 does not unseat until the pressure drop across the first valve means 40 reaches the desired set point pressure drop. Since the pressure differential between the fuel pressure acting on the upstream face 57 of the piston 54 and that acting on the downstream face 59 of the piston 54 is indicative of the fuel flow pressure drop across the first valve means 40, the flow area of outlet 53 open will automatically adjust to maintain a the fuel flow pressure drop across the first valve means 40 relatively constant at the set point pressure drop. Thus, the second valve means 50 acts as a bypass valve when the combustor is in operation to bypass that portion of the metered fuel flow delivered to the valve assembly 30 that is in excess of that required in the pilot combustion chamber 20a to the second combustion chamber 20b.

When the metering valve 42 is positioned by the EEC 16 to its full open position, the pressure drop therethrough is below the desired set point pressure drop and, therefore, the pressure differential between the fuel pressure in the third fuel passage upstream 36 of the second valve means 50, which pressure acts upon the upstream face 57 of the piston 54, and the fuel pressure in the downstream portion of the second fuel passage 34, which acts upon the downstream face 59 of the piston 54, will be insufficient to overcome the bias force exerted on the piston 54 by the spring 56. Therefore, the spring 56 will exert sufficient force on the piston 54 to bias it into closure. With the second valve means 50 closed, all the metered fuel received by the valve assembly 30 will pass through the wide open first valve means 40 to the pilot combustion chamber. Thus, when the second combustion chamber is out of operation, the EEC 16 will position the metering valve 42 to fully open the first valve means 40, thereby causing the second valve means 50 to close, and control the flow of fuel to the first combustion chamber simply by controlling the upstream FMU to meter the desired fuel flow to the valve assembly 30.

Figure 3:
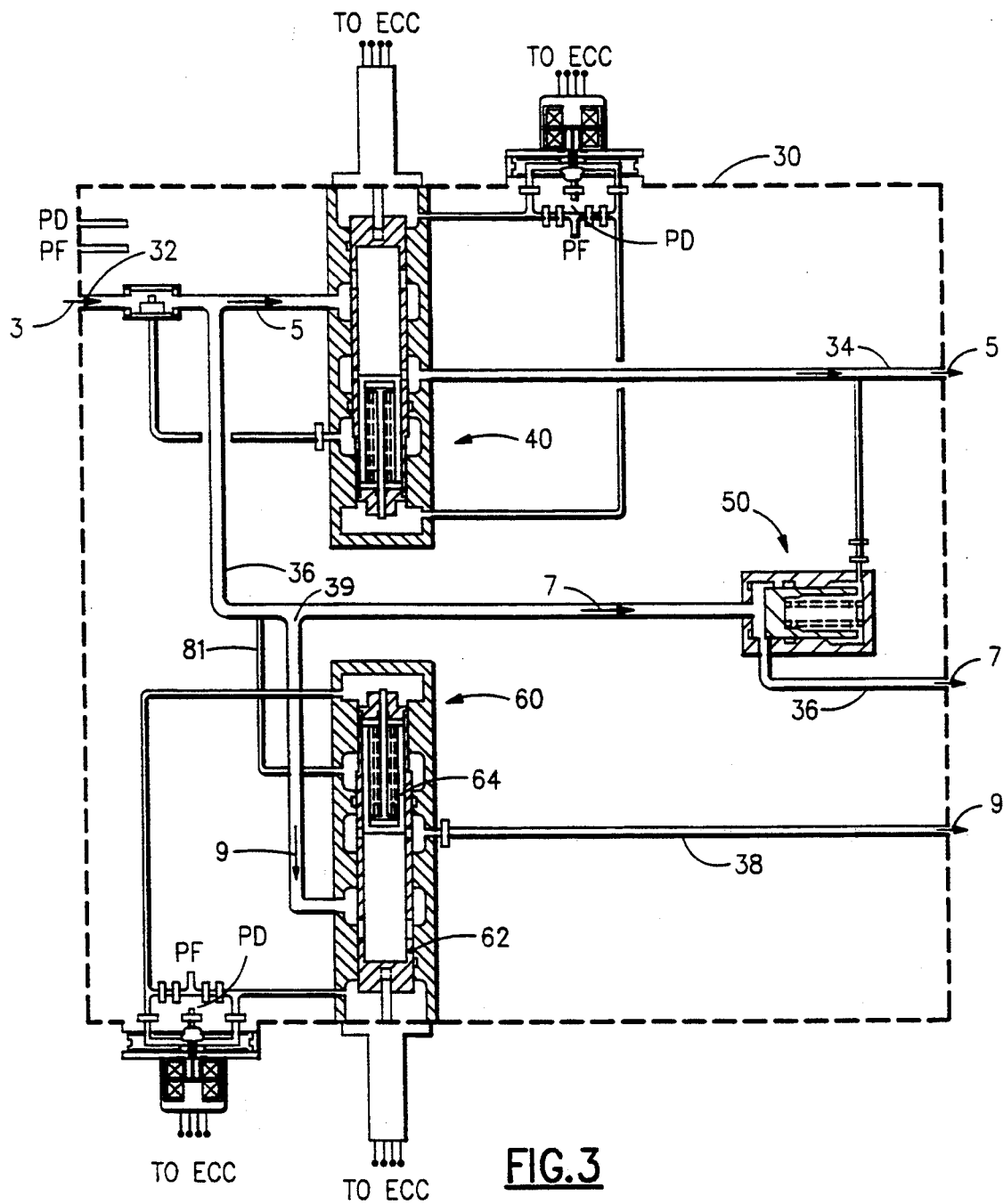
FIG. 3 is a schematic diagram of an embodiment of the fuel splitter valve of the present invention adapted for delivering fuel to each camber of a three chamber combustor.

Referring now to FIG. 3, there is depicted an embodiment of the valve assembly of the present invention adapted to deliver fuel to a combustor having more than two combustion chambers, in this case three combustion chambers. In this embodiment, the fuel splitter valve assembly 30 has a fourth fuel passage 38 having an inlet 39 opening to the third fuel passage 36 at a location upstream of the second valve means 50 and an outlet in fluid communication through a fuel distribution system to a plurality of fuel nozzles for injecting the fuel into the third combustion chamber (not shown). Disposed in the fourth fuel passage 38 is a third valve means 60 which, like the first valve means 40, comprises flow metering means for controllably metering an additional portion 9 of the metered fuel flow 3 to the third combustion chamber, and pressure regulating means for regulating the pressure drop through the flow metering means to a relatively constant value. The third valve means 60 is controlled by the EEC 16 in a manner similar to the manner hereinbefore described with respect to the first valve means 40. The EEC 16 selectively positions the flow metering means 62 of the third valve means 60 to pass a desired amount of fuel flow through the downstream portion of the fourth fuel passage 38 for delivery to the third combustion chamber. The pressure regulating means 64 of the third valve means 60 is selectively positioned in response to the pressure differential, that is the pressure differential between the fuel pressure in the third fuel passage 36 upstream of the inlet to the fourth fuel passage 38, which pressure is ported to pressure regulating means 64 through conduit 81, and the fuel pressure of the fuel flow passing through the flow metering valve means 62 so as to maintain a constant pressure drop through the flow metering valve means 62.

In the embodiment depicted in FIG. 3, the second valve means 50 again acts as a bypass valve when the combustor is in operation to bypass that portion of the metered fuel flow delivered to the valve assembly 30 that is in excess of that required in the first combustion chamber or the third combustion chamber to the second combustion chamber, while the EEC 16 controls the first and third valve means 40 and 60 to precisely meter fuel flow to the first and third combustion chambers. It is to be understood, that the fuel splitter valve assembly 30 of the present invention may be adapted to deliver fuel to additional combustors by adding an additional fuel passage for each additional combustor chamber, and an additional flow metering and pressure regulating valve means, i.e. valve means functioning similar to valve the first and third valve means 40 and 60, in each additional fuel passage, each additional valve means being controlled by the EEC 16 to precisely meter fuel to its respective combustion chamber.

Although the invention has been shown and described with respect to a best mode embodiment exemplary thereof, it should be understood by those skilled in the art that various modifications, changes, omissions and additions in the form and detail thereof may be made without departing from the spirit and scope of the invention.

We claim:

1. A fuel splitter valve assembly for a combustor of a gas turbine engine, said combustor having a first combustion chamber and at least a second combustion chamber, comprising:

a first fuel passage having an inlet for receiving a flow of fuel, a first outlet and a second outlet;

a second fuel passage having an inlet opening to the first outlet of said first fuel passage for receiving a first portion of said fuel flow and an outlet opening in fluid flow communication with the first combustion chamber;

a third fuel passage having an inlet opening to the second outlet of said first fuel passage for receiving a second portion of said fuel flow and an outlet in fluid communication with the second combustion chamber, a first valve disposed in said second fuel passage and having an inlet, an outlet, a selectively positionable first spool means disposed therebetween for controllably metering fuel flow through said first valve, the fuel flow passing through said first valve experiencing a pressure drop, and a self-positioning second spool means for controlling the area of the first valve outlet so as to regulate said pressure drop, the inlet of said first valve opening to an upstream portion of said second fuel passage and the outlet of said first valve opening to a downstream portion of said second fuel passage; and a second valve having an inlet, an outlet, and selectively positionable piston means disposed therein, said piston means operative whenever said pressure drop across said first valve reaches a preselected desired set point pressure drop to direct an additional fuel flow for delivery to the second combustion chamber, said second valve disposed in said third fuel passage, the inlet of said second valve opening to an upstream portion of said third fuel passage and the outlet of said second valve opening to a downstream portion of said third fuel passage.

2. A fuel splitter valve assembly as recited in claim 1 wherein said piston means of said second valve is further operative to shut off fuel flow through the third fuel passage to said second combustion chamber whenever said pressure drop is less than the set point pressure drop.

* * * * *